United States Patent [19]

Ohki

[11] Patent Number: 4,651,206
[45] Date of Patent: Mar. 17, 1987

[54] INTER-FRAME CODING APPARATUS FOR VIDEO SIGNAL

[75] Inventor: Junichi Ohki, Tokyo, Japan

[73] Assignee: NEC Corporation, Japan

[21] Appl. No.: 690,130

[22] Filed: Jan. 10, 1985

[30] Foreign Application Priority Data

Jan. 11, 1984 [JP] Japan .................................. 59-2913

[51] Int. Cl.$^4$ .............................................. H04N 7/12
[52] U.S. Cl. .................................... 358/136; 358/105; 358/167
[58] Field of Search ............... 358/105, 133, 136, 138, 358/167; 375/27

[56] References Cited

U.S. PATENT DOCUMENTS

| 4,232,338 | 11/1980 | Netravali et al. | 358/105 X |
| 4,255,763 | 3/1981 | Maxemchuk et al. | 358/133 X |
| 4,270,143 | 5/1981 | Morris | 358/105 X |
| 4,307,420 | 12/1981 | Ninomiya et al. | 358/136 |

Primary Examiner—Harold Broome
Assistant Examiner—Patrick W. Foster
Attorney, Agent, or Firm—Ostrolenk, Faber, Gerb & Soffen

[57] ABSTRACT

An inter-frame coding circuit for encoding a television video signal to reduce the quantity of data to be transmitted. The coding circuit includes a motion detection circuit which produces a motion vector representative of motion contained in the television signal and an inter-frame prediction coder which is responsive to the motion vector and to the input television signal to produce a prediction error signal which indicates frame-to-frame variations in the television signal. Also included is a refresh circuit for spatially correlating the input signal on an intra-frame basis. To reduce or eliminate the possibility that an error in the signal is magnified, the motion vector is set to zero for a predetermined period in relation to an area or a portion of the video signal for which a refresh operation has just been completed. A transmission circuit transmits the motion vector signal, the prediction error signal, and a refresh execution signal which are used for reproducing the original video signal. A counterpart decoding circuit for receiving the transmitted signals and reproducing from them the original video signal is provided.

8 Claims, 13 Drawing Figures

INTER-FRAME CODING APPARATUS FOR VIDEO SIGNAL

BACKGROUND OF THE INVENTION

This invention relates to an inter-frame coding circuit for a video signal.

It is known to use an inter-frame coding method for transmitting a video signal in order to reduce the quantity of transmitted information. The known inter-frame coding method produces a good compression factor for a video signal representing a picture containing little motion such as a still picture. But it is leff effective when a video signal containing a great deal of motion is processed. To overcome this drawback, a motion compensated inter-frame coding method has been described in which motion contained in the video signal is detected between frames and the video signal is coded by using the detected motion. One example of such a method is disclosed in U.S. Pat. No. 4,371,895 entitled, "CODED VIDEO SIGNAL TRANSMITTING AND RECEIVING SYSTEM". In the inter-frame coding method, when a channel error occurs in the transmitted data, the error decodes the picture reproduced therefrom. To cope with this problem, a refreshing operation in which a non coded video signal, which is not temporally correlated, is periodically transmitted. One example of an encoding, used for the refreshing operation, is a, so called previous value difference coding.

In the inter-frame coding method which uses motion compensation, an error, when occuring, spatially moves in the reproduced picture due to the motion compensation, which works to magnify the error. Therefore, it is frequently difficult to remove the error with the refreshing operation and, at worst, the error cannot be removed at all.

SUMMARY OF THE INVENTION

Accordingly, it is an object of the present invention to provide an inter-frame coding circuit for a video signal which can reliably refresh a picture when the motion compensation is used.

According to the present invention, there is provided a video signal coding apparatus comprising: a motion detector for detecting a motion contained in the video signal to deliver a motion vector, an inter-frame prediction coder for coding the video signal in response to the motion vector, an intra-frame coder for coding the video signal by using a spatial correlation of the video signal for refresh operation, a control circuit for alternatively selecting the inter-frame prediction coder and the intra-frame coder to code the video signal, and a motion compensation inhibiting circuit for inhibiting the operation of the motion detector for a predetermined period with respect to an area where the refresh operation has been completed.

DESCRIPTION OF THE PREFERRED EMBODIMENT

Figure 1:
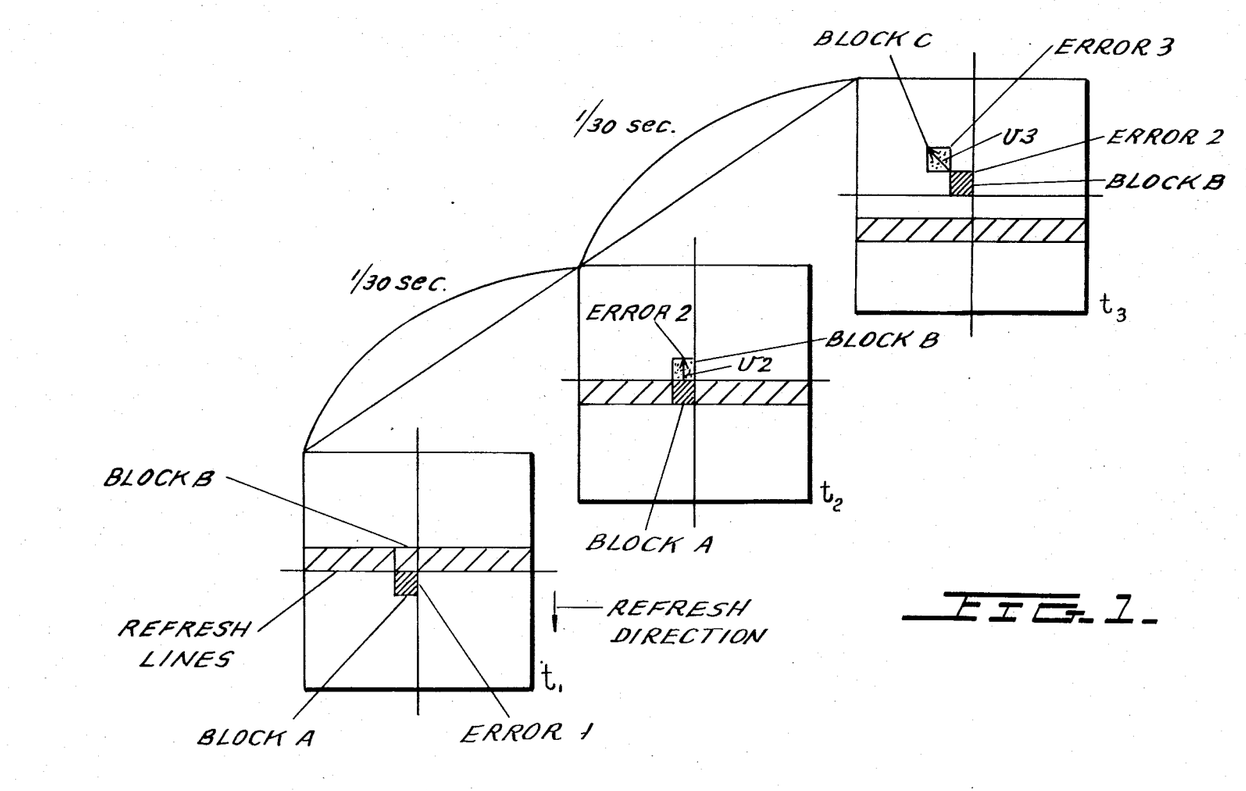
FIG. 1 shows the refresh operation in accordance with conventional motion compensated inter-frame coding scheme.

A refresh operation in accordance with the conventional motion compensated inter-frame coding scheme will first be explained. In FIG. 1, it is assumed that coding is carried out at every block with N lines in the vertical direction, and a refreshing operation is conducted per N lines in the raster scanning direction every frame. It is also assumed that a vertical range of motion compensation does not exceed N lines. The hatched area shows the N lines where refresh is to be carried out. Now, let it be assumed that the N lines which include the block B are refreshed at the time $t_1$ and that an error 1 is generated with respect to an arbitrary block A.

At the time $t_2$, the motion compensated inter-frame coding and decoding is carried out for the block B which is in the vicinity of the block A by using a latest vector $V_2$ which has been detected with respect to the block B and which has a magnitude and direction as shown in FIG. 1. So far, the coding by using the vector $V_2$ on a transmitting side executes correctly. On a receiving side, however, when decoding of the block B by using the vector $V_2$ is attempted, since an block A includes the error, the error in block A moves to the block B which has just been refreshed at the time $t_1$. Therefore, the moved error becomes an error 2. At the time $t_3$, the error 2 included in the block B is moved to become an error 3 by a latest vector $V_3$ which has been detected with respect to a block C which is in the vicinity of the block B and which has a magnitude and direction as shown in this figure. In this manner, progressively in time, the error shifts or enlarges and cannot be removed through conventional refresh operations.

Figure 2:
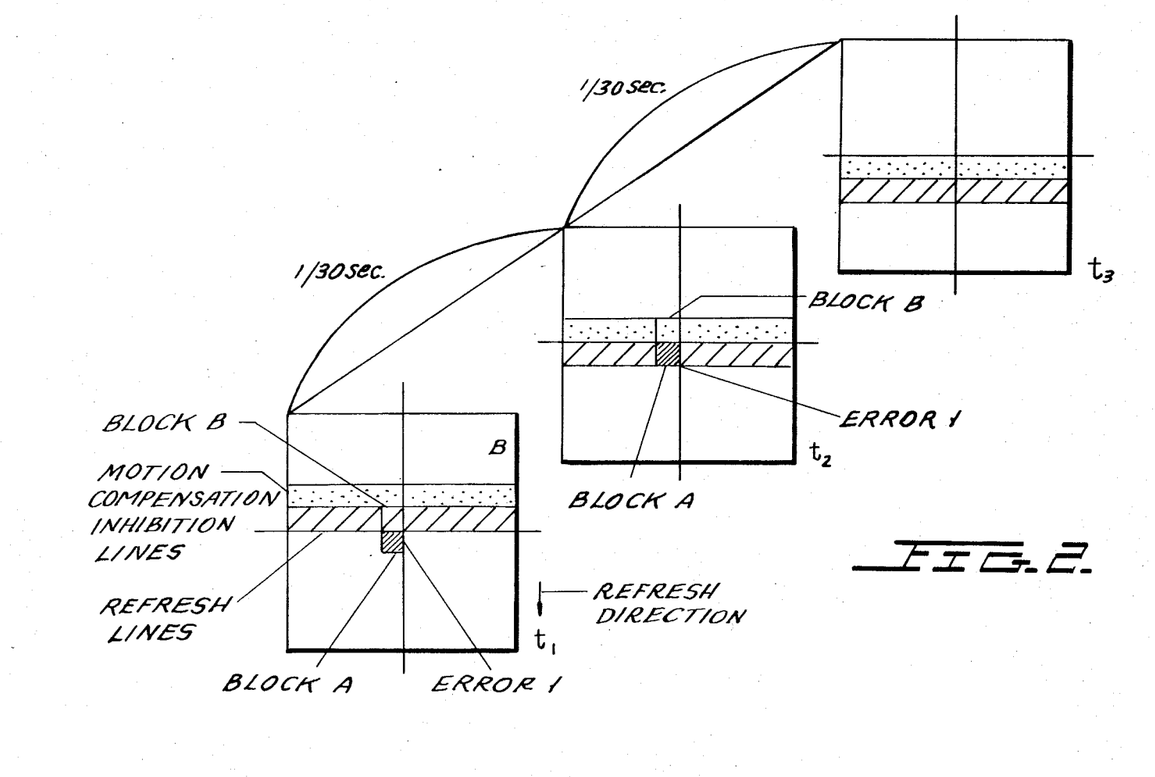
FIG. 2 shows the refresh operation according to the present invention.

Next, the principle of the present invention will be described with reference to FIG. 2. The above-described drawback in the prior art is caused by the fact that motion compensation is conducted even in the N lines where the refresh operation has been just as in any other locations. Therefore, if the motion compensation is inhibited at least in the N lines where refreshing operation has been just finished, the above drawback can be overcome. This principle will be explained in detail below. As in FIG. 1, it is supposed that an error is generated in a block A at the time $t_1$. In the present invention, the N lines (the hatched area) which include the block B are refreshed and the motion compensation is inhibited (hereafter referred to as "motion compensation inhibition line") at least in the N lines where the refresh operation has been just taken place (the dotted portion). At the time $t_2$, since the motion compensation is inhibited at least in the N lines where refresh operation has been undertaken, there is no spatial shift of the error in the block A to the block B unlike the case in FIG. 1. Therefore, there is no destruction of any picture element within the motion compensation inhibition line, and the error 1 generated in the block A at the time $t_1$ is refreshed and removed.

At the time $t_3$, there is no possibility of error movement or error enlargement since the error has been removed at the time $t_2$. Consequently, in accordance with the present invention, picture elements are not distorted by an error that has moved to the area where a refresh operation has already been completed, and can be quickly removed through only one refresh operation. It is to be noted that when the vertical range for motion compensation is $N_v$ ($N_v > N$), the $N_v$ line is designated as the motion compensation inhibition line.

Figure 3:
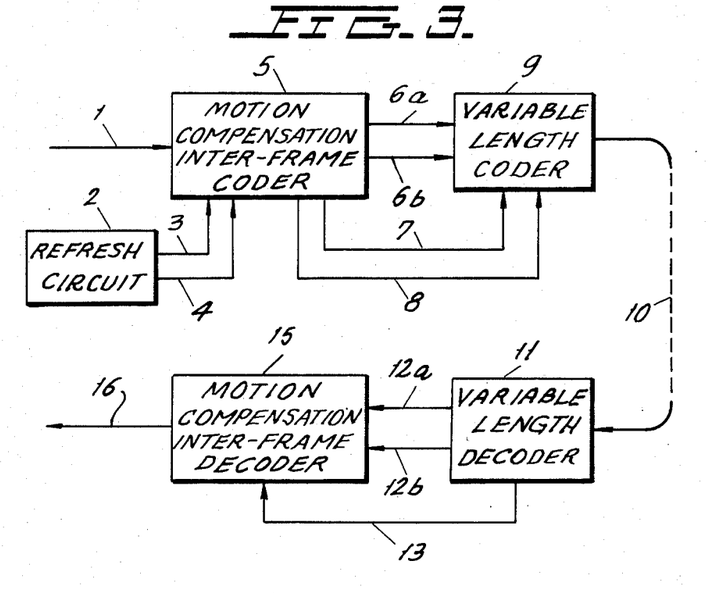
FIG. 3 schematically shows an embodiment of the present invention in a case where a motion vector is transmitted to a receiver.

Embodiments of the present invention will now be described with reference to the accompanying drawings. FIG. 3 schematically shows an embodiment of an inter-frame encoding and decoding apparatus which uses motion compensation. A digitized television video signal is supplied to a motion compensation inter-frame coder 5 from an input signal line 1. A refresh control circuit 2 produces a refresh execution signal and a motion compensation inhibition signal and supplies them to the motion compensation inter-frame coder 5 via signal lines 3 and 4 to control the refresh operation and the inhibition of the motion compensation.

In lines where the refresh operation is designated, coding such as, for example, previous value difference coding which is not inter-frame prediction coding is conducted. A prediction error e and a motion vector v, delivered from the motion compensation inter-frame coder 5 are supplied to a variable length coder 9 through signal lines 6a and 6b. The refresh execution signal and the motion compensation inhibition signal which are phased or synchronized to the other signals e and v from the motion compensation inter-frame coder 5 are also supplied to the variable length coder 9 through a signal line 7 and a signal line 8, respectively. In this case, when the motion compensation inhibition signal indicates the inhibition is required, the motion vector is zeroed. The motion vector and the prediction error signal which are converted into variable length codes, and the refresh execution signal are transmitted to a transmission line 10 to be fed to a receiving side.

In the receiving side, a variable length decoder 11 decodes the prediction error signal, the motion vector and the refresh execution signal, and supplies them to a motion compensation inter-frame decoder 15 through a signal line 12a, a signal line 12b and a signal line 13, respectively. The motion compensated inter-frame decoder 15 basically decodes the prediction error signal in accordance with the motion vector to reproduce the television video signal at line 1. But, when the refresh operation is conducted in a given area (N lines), the decoder 15 reproduces the television video signal in accordance with a coding method which has been used on the transmitting side in the refresh operation. For example, the coding method can be a previous value difference coding. In this embodiment, since the motion compensation inhibition corresponds to the motion vector of zero, the decoder 15 reproduces the television video signal in accordance with the inter-frame prediction coding without the motion compensation when the motion compensation is inhibited. Consequently, when the moving vector is received, the signal can be decoded correctly without the motion compensation inhibition signal. The signal decoded by the motion compensation inter-frame decoder 15 is a digital signal which is supplied to an output signal line 16 and comprises the television video signal.

Figure 4:
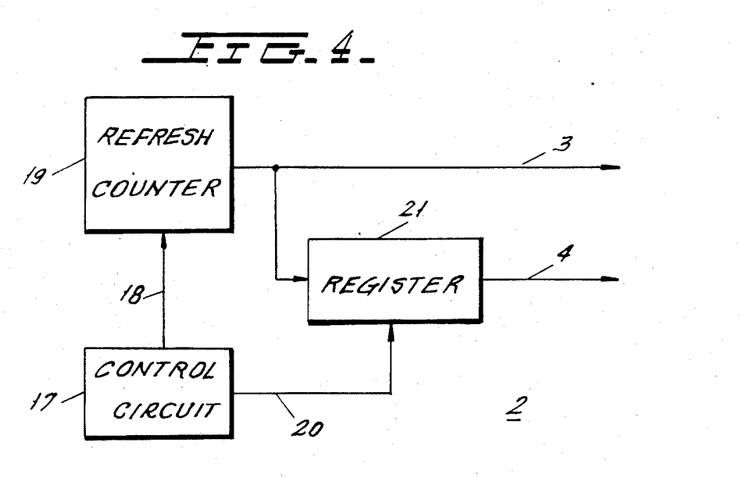
FIG. 4 is a block diagram of a refresh control circuit shown in FIG. 3.

The refresh circuit 2 is illustrated, in block form, in FIG. 4. A refresh clock which is generated in a control circuit 17 is supplied to a refresh counter 19 through a signal line 18, which produces the refresh execution signal by, for example, counting the lines. The refresh execution signal generated by the refresh counter 19 moves by the N lines at every frame or several frames. The refresh execution signal is supplied to the motion compensation inter-frame coder 5 shown in FIG. 3 through the signal line 3 and to a register 21. The register 21 delays the refresh execution signal by a period of N lines in response to a set pulse which is supplied from the control circuit 17 through a signal line 20. It then transmits at a signal line 4 the motion compensation inhibition signal. This inhibits the motion compensation in the N lines in which a refresh operation has just been completed.

Figure 5:
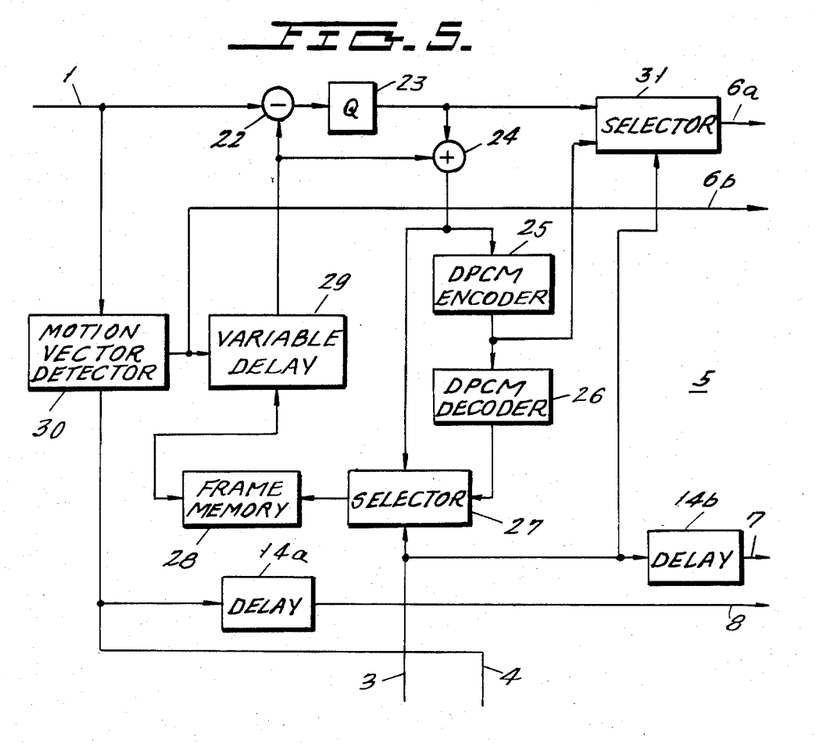
FIG. 5 is a block diagram of a motion compensated inter-frame coder shown in FIG. 3.

Next, the motion compensation inter-frame coder 5 will be explained with reference to FIG. 5. A digitized television signal is supplied to a subtracter 22 and a motion vector detector 30 through the input signal line 1. The motion vector detector 30 detects an optimum signal, namely the motion vector, based on, for example, a preceding frame of the video signal and a present frame of the video signal. The motion compensation inhibition signal is supplied to the motion vector detector 30 through the signal line 4, and when the motion compensation is inhibited, a motion vector which designates inter-frame prediction, having a value of zero is produced. The motion vector output from the motion vector detector 30 is supplied externally over a line 6b and is also input to a variable delay circuit 29. The variable delay circuit 29 controls the time delay associated with a locally decoded signal which is delivered from a frame memory 28 in response to the given motion vector. The locally decoded signal is to the subtracter 22 and to an adder 24. The subtractor 22 delivers a signal which represents the difference between the present frame video signal from the signal line 1 and the variably delayed video signal corresponding to the previous frame which is delayed by about one frame period which is supplied from the variable delay circuit 29.

The output signal from the subtracter 22, is the prediction error signal. This error signal is quantized by a quantizer 23 and supplied to a selector 31 and an adder 24. The adder 24 reproduces the locally decoded signal by using the quantized prediction error signal and the signal generated about one frame period before which is delivered from the variable delay circuit 29.

The locally decoded signal is supplied to a DPCM encoder 25 and to a selector 27. The DPCM encoder 25 codes the locally decoded signal by using an intra-frame coding method to produce the previous value difference, and supplies it to the selector 31 as a refresh signal and to a DPCM decoder 26. The DPCM decoder 26 is subjected to inter-frame local decoding and supplies the decoded signal to the selector 27. The selector 27 selects the decoded signal delivered from the DPCM decoder 26 and supplies it to the frame memory 28 when the refresh operation is performed in accordance with the refresh execution signal which is supplied through the signal line 3. When refresh is not carried out, the selector 27 selects the locally decoded signal delivered from the adder 24 and supplies it to the frame memory 28.

The selector 31 selects the refresh signal delivered from the DPCM encoder 25 instead of the prediction error signal in accordance with the refresh execution signal, and supplies the selected one to the variable length encoder 9 (FIG. 3) through the signal line 6a. The motion compensation inhibition signal and the refresh execution signal are fed to the lines 7 and 8 through delay circuits 14a and 14b.

Figure 6:
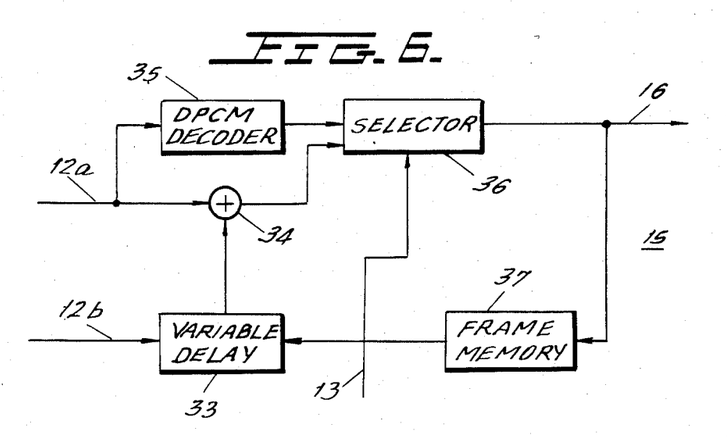
FIG. 6 is a block diagram of a motion compensated inter-frame decoder shown in FIG. 3.

Referring to FIG. 6, the motion compensation decoder 15 (FIG. 3) is now explained. The prediction error signal delivered from the variable length decoder 11 (FIG. 3) is supplied to an adder 34 through the line signal 12a. The motion vector is supplied to a variable delay circuit 33 through the line signal 12b so that the actual delay amount is controlled in response to the speed and direction of the motion vector. As explained above, since the motion vector is zero when motion compensation is inhibited, an inter-frame decoding without motion compensation is conducted. The signal decoded about one frame period before is supplied from the frame memory 37 to the variable delay circuit 33, and the delay time is controlled in the variable delay circuit 33. The adder 34 performs motion compensated decoding by adding the prediction error signal supplied through the signal line 12a and the signal decoded about one frame period before, which is subjected to the delay time control and which is supplied from the variable delay circuit 33. The added signal is supplied by the adder 34 to a selector 36. A DPCM decoder 35 decodes the intra-frame coded signal delivered through the signal line 12a in an intra-frame decoding manner when the refresh operation is conducted, and supplies the decoded signal to the selector 36 as a refresh signal. The selector 36 selects one or the other of its two inputs in accordance with the refresh execution signal which is fed through the signal line 13, such that it selects the output of the DPCM decoder 35 when refreshing is executed and otherwise selects the output of the adder 34. The output delivered from the selector 36 is supplied to the frame memory 37 and, at the same time, is transmitted to a signal line 16 as an output from the motion compensation inter-frame decoder 15, i.e., a reproduced digital television video signal.

Figure 7:
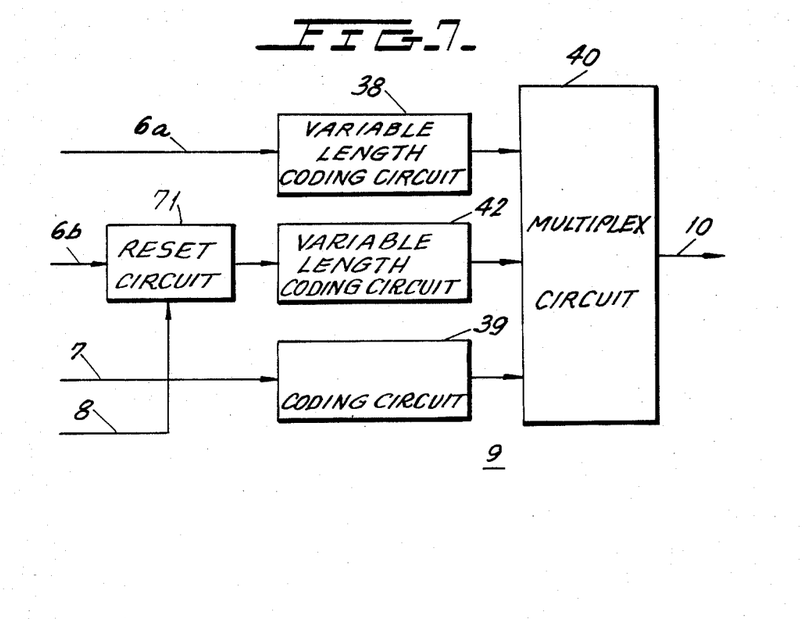
FIG. 7 is a block diagram of a variable length coder used in FIG. 3.

The structure of the variable length encoder 9 (FIG. 3) will be described with reference to FIG. 7. The prediction error signal (or the refresh signal) supplied through the line 6a is coded in a variable length coding circuit 38 and is fed to a multiplex circuit 40. The refresh execution signal supplied through the line 7 is coded a coding circuit 39 and is fed to the multiplex circuit 40. The motion vector from the line 6b is controlled by the motion compensation inhibition signal from the line 8 in a reset circuit 41 and is fed to a variable length coding circuit 42. Thus, when motion compensation is inhibited, in the reset circuit 41, the motion vector becomes zero. The multiplex circuit 40 multiplexes the prediction error signal, the refresh execution signal and the motion vector signal from the circuits 38, 39 and 42, respectively, and feeds them to the transmission line 10.

Figure 8:
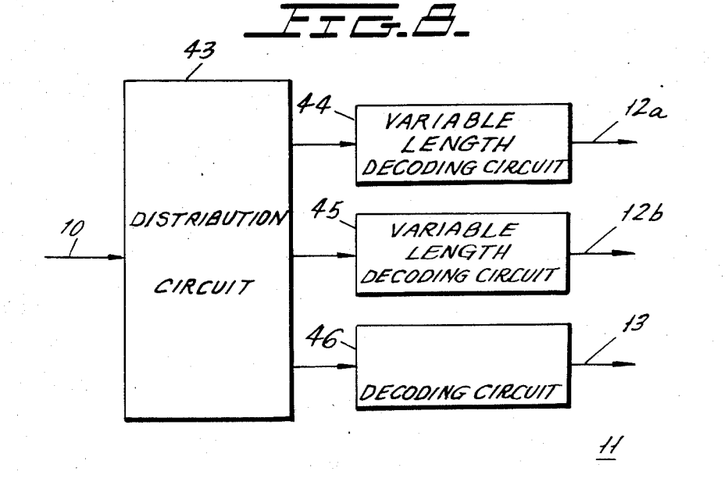
FIG. 8 is a block diagram of a variable length decoder used in FIG. 3.

FIG. 8 shows the structure of the variable length decoder 11 (FIG. 3). The prediction error signal (or the refresh signal), the motion vector signal and the refresh execution signal sent through the transmission line 10 are separated by a distribution circuit 43 and are decoded in variable length decoding circuits 44 and 45, and a decoding circuit 46, respectively. The respective signals are sent to the motion compensation inter-frame decoder 15.

Next, a second embodiment of the invention, in which a motion vector is not transmitted to a receiving side, will be described. If, for example, the system which is described at pages 631–670 of *Bell System Technical Journal*, March, 1979 and which is entitled "Motion Compensated Television Coding: Part I" by A. N. Netravali, et al., is used, the motion vector is detected only by the use of the locally decoded signal, and, in this case, it is unnecessary to transmit the motion vector from a transmitting side to the receiving side.

Figure 9:
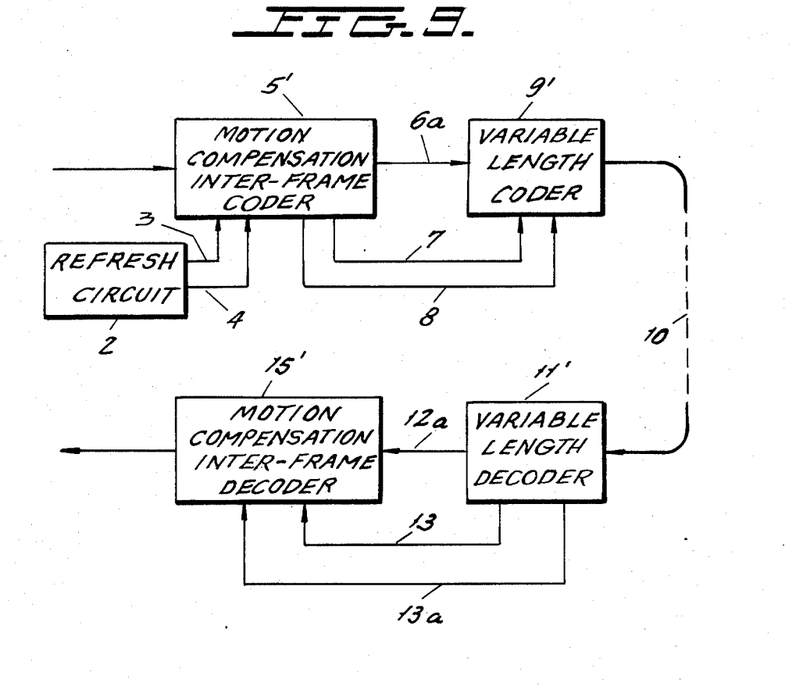
FIG. 9 schematically shows a second embodiment of the present invention in a case where a motion vector is not transmitted to a receiver.

In FIG. 9 wherein the second embodiment of the present invention is shown, only a prediction error signal is supplied from a motion compensation inter-frame coder 5' to a variable length coder 9' through a line 6a. Namely, the motion vector is not transmitted. The variable length coder 9' transmits the prediction error signal, a refresh execution signal and a motion compensation inhibition signal in a multiplexed manner to the receiving side. At the receiving side, a variable length decoder 11' decodes the prediction error signal, the refresh execution signal and the motion compensation inhibition signal and supplies them to a motion compensation inter-frame decoder 15' through respective lines 12a, 13 and 13a.

Figure 10:
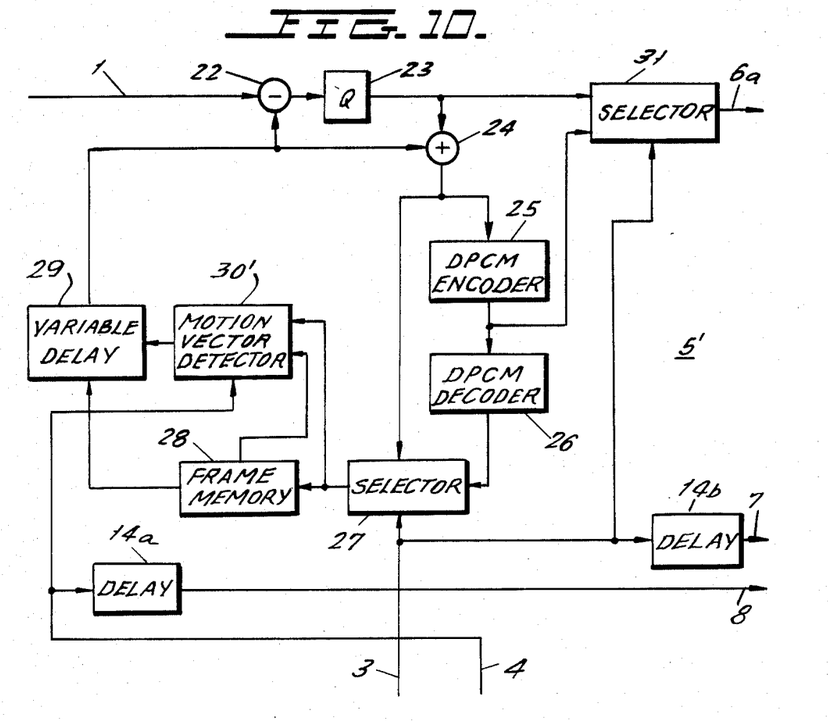
FIG. 10 is a block diagram of a motion compensated inter-frame coder shown in FIG. 9.
Figure 11:
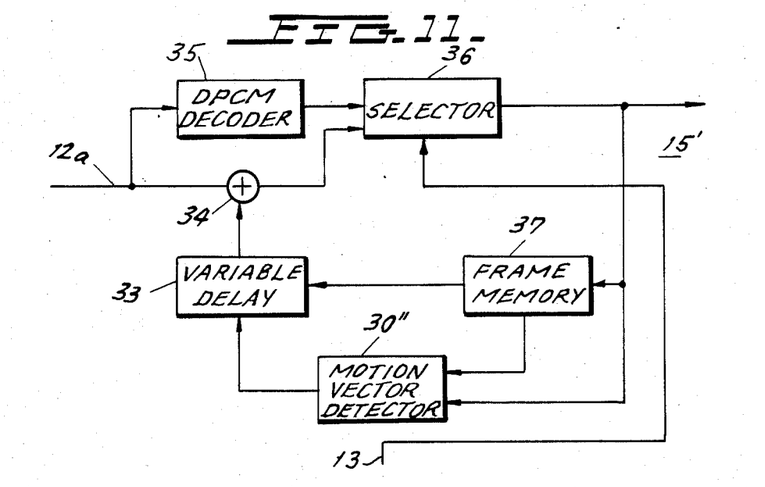
FIG. 11 is a block diagram of a motion compensated inter-frame decoder shown in FIG. 9.

FIG. 10 illustrates the block diagram of the motion compensation inter-frame coder 5'. A motion vector detector 30', which controls a variable delay circuit 29, detects a motion vector by receiving a locally decoded video signal delivered from a selector 27 and a video signal delivered from an intermediate tap of a frame memory 28. In this embodiment, the motion vector detected by the detector 30' is not transmitted to the receiving side. In FIG. 11 showing the block diagram of the motion compensation inter-frame decoder 15', a motion vector detector 30" detects the motion vector in response to a video signal delivered from a selector 36 and a video signal delivered from an intermediate tap of a frame memory 37 as in FIG. 10, and controls a variable delay circuit 33.

Figure 12:
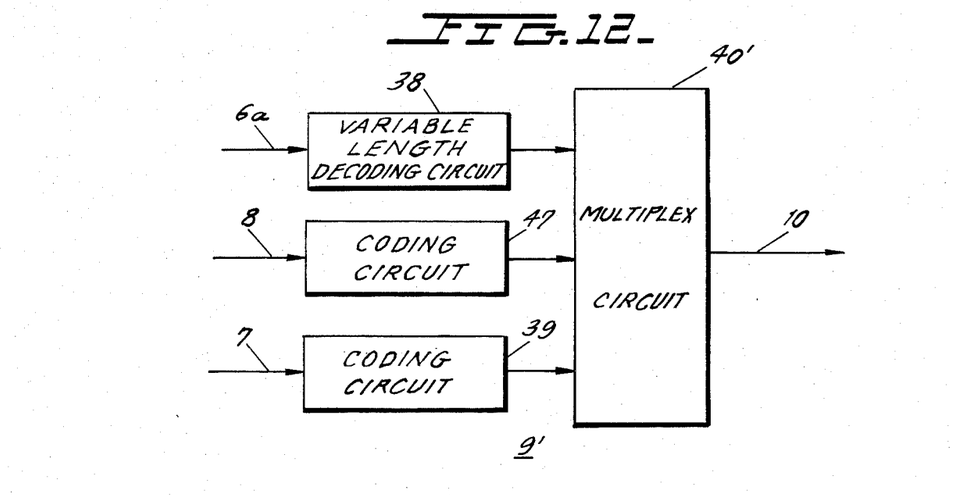
FIG. 12 in a block diagram of a variable length coder used in FIG. 9.

FIG. 12 shows the block diagram of the variable length coder 9'. The prediction error signal is coded by a variable length coding circuit 38, and the refresh execution signal and the motion compensation inhibition signal are coded by respective coding circuits 39 and 47. A multiplex circuit 40' multiplexes those coded signals and transmits them over a transmission line 10.

Figure 13:
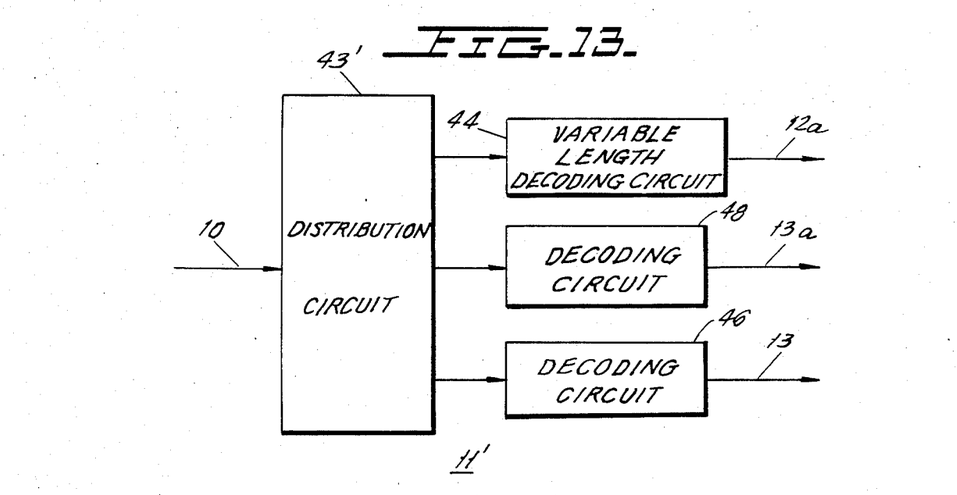
FIG. 13 is a block diagram of a variable length decoder used in FIG. 9.

FIG. 13 is the block diagram of the variable length decoder 11'. Here, the multiplexed signals are separated into the coded prediction error signal, the coded refresh execution signal and the coded motion compensation inhibition signal by a distribution circuit 43'. The coded prediction error signal is decoded by a variable length decoding circuit 44 and transmitted to a line 12a. The coded refresh execution signal and the coded motion compensation inhibition signal are decoded by respective decoding circuits 46 and 48, and supplied to respective lines 13 and 13a.

In the Bell article described above, coding is carried out for every line, but the inhibition of the motion compensation in the second embodiment coding is executed for a period corresponding to the number of lines in the vertical direction of the motion compensation, as in the first embodiment.

In the embodiments, the intra-frame coding such as the DPCM of the locally coded signal is used for producing the refresh signal. Alternatively, the DPCM of the input digital video signal (PCM) supplied from the line 1 for the input to the DPCM encoder 25 or for usage of the locally decoded signal may be applied to the refresh signal. In the latter case, the DPCM decoder 26, the selector 27 and the DPCM decoder 35 are unnecessary. Further, in place of the DPCM coding, an orthogonal transform coding may be used. In this case, reference numeral 25 refers to an orthogonal transform encoder and reference numeral 35 refers to an orthogonal conversion decoder.

As described above in detail, according to the present invention, the error which is generated in the motion compensation inter-frame coding and the motion compensation inter-frame decoding can be removed quickly before it moves and enlarges. Accordingly, application of the present invention produces beneficial results.

What is claimed is:

1. A coding circuit for an input video signal comprising:
    means for detecting motion contained in said input video signal and for producing a motion vector representative of said motion;
    means responsive to said motion vector for coding said input video signal in accordance with an inter-frame prediction coding scheme to produce a prediction signal;
    refresh means for coding said input video signal by spatially correlating said input video signal to produce a refresh signal;
    selector means for alternatively selecting and supplying said prediction signal or said refresh signal; and
    means for inhibiting the operation of said motion detecting means for a predetermined period with respect to a portion of said video signal for which a refresh operation has been carried out.

2. A coding circuit for an input video signal comprising:
    motion detection means, responsive to said input video signal, for generating a motion vector which is representative of motion contained in said input video signal, and means for setting said motion vector to zero for a predetermined period with respect to a portion of said video signal for which a refresh operation has been carried out;
    means for generating a prediction signal in response to a previously stored video signal and said motion vector;
    first coding means for generating a prediction error signal which is representative of the differences between said prediction signal and said input video signal;
    second coding means for generating a refresh signal, said refresh signal being related the sum of said prediction error signal;
    selector means for alternatively selecting and supplying said refresh signal when a refresh operation is completed or said prediction error signal; and
    transmission means for transmitting an output supplied from said selector means, said motion vector, and a refresh execution signal.

3. A coding circuit for an input video signal comprising:
    means for detecting motion contained in said input video signal and for producing a motion vector representative of said motion;
    means for generating a prediction error signal in response to said motion vector and said input video signal;
    means for generating a refresh signal when a refresh operation is carried out to said video signal;
    means for producing a motion compensation inhibition signal for a predetermined period after said refresh operation has been carried out;
    selector means for alternatively selecting and supplying said prediction error signal and said refresh signal; and
    transmission means for transmitting an output supplied from said selector means, said motion compensation inhibition signal and a refresh execution signal.

4. An encoding circuit for a television type video signal, said circuit comprising:
    motion detection means, responsive to inter-frame variations in said video signal, for producing a motion vector signal which is representative of motion detected in said video signal;
    a refresh circuit for generating a refresh execution signal and an inhibit signal, and means for carrying out a refresh operation with respect to said video signal, said refresh execution signal activating said refresh operation and said inhibit signal occurring about when said refresh operation has been completed, said motion vector signal being set to a value of zero, with respect to a portion of said video signal for which said refresh operation has been carried out in response to said inhibiting signal;
    motion compensation means, responsive to said refresh execution signal, said inhibition signal, and said video signal, for producing a prediction error signal based on an inter-frame coding scheme; and
    means for transmitting said prediction error signal, said motion vector signal and said refresh execution signal.

5. The encoding circuit of claim 4, wherein said refresh operation employs a previous value difference coding scheme.

6. The encoding circuit of claim 4, wherein said motion compensation means further comprise means for producing a refresh signal in response to said motion vector signal and said prediction error signal and selector means for substituting said refresh signal for said prediction error signal for transmission in response to the state of said refresh execution signal.

7. The encoding circuit of claim 4, wherein said means for transmitting comprises means for time division multiplexing said prediction error signal, said motion vector signal, and said refresh execution signal for the transmission data.

8. An encoding circuit for a television type video signal, said circuit comprising:
    motion detection means, responsive to inter-frame variations in said video signal, for producing a motion vector signal which is representative of motion detected in said video signal;
    a refresh circuit for generating a refresh execution signal and an inhibit signal, and means for carrying out a refresh operation with respect to said video signal, said refresh execution signal activating said refresh operation and said inhibit signal occuring about when said refresh operation has been completed, said motion vector signal being set to a value of zero, with respect to a portion of said video signal for which said refresh operation has been carried out in response to said inhibiting signal; and means for transmitting, in a multiplexed manner, said prediction error signal, said refresh execution signal and said inhibit signal.

* * * * *